Feb. 10, 1959     I. V. ZOZULIN     2,873,394

VARIABLE MAGNETIC DRIVE FOR AGITATORS

Filed Feb. 12, 1957

INVENTOR
IGOR V. ZOZULIN

Ernest E. Carver
ATTORNEY

United States Patent Office 2,873,394
Patented Feb. 10, 1959

2,873,394

VARIABLE MAGNETIC DRIVE FOR AGITATORS

Igor V. Zozulin, Vancouver, British Columbia, Canada, assignor to Tormag Transmissions Limited, Vancouver, British Columbia, Canada Application February 12, 1957, Serial No. 639,802

5 Claims. (Cl. 310—105)

The invention relates to machines of the general type known as agitators. The use is to stir, mix, or blend various liquid solutions or mixtures, of different viscosities, or of viscosity which changes as the mixing proceeds, or for mixture of solid particles with or without liquid vehicle.

Such a machine consists essentially of a prime mover, usually an electric motor of induction type, connected by suitable speed reducing gear train to an output shaft to which impellers are attachable, adapted to be mounted on a tank containing the material to be mixed so that the rotating impeller stirs or agitates the same.

The present invention has to do with the drive mechanism. The material difference between the subject agitator and those in common use is a variable speed magnetic torque converter as one stage of the speed reduction train.

The variable speed magnetic torque converter to which reference is made above is as described in my co-pending application for the same, having however novel speed variation means suited to the subject use.

Variable speed is an advantage in an agitator. Speed variation by means of multispeed or variable speed electric motors is not in general use because of the expense and complexity of the necessary electrical arrangements, and for other reasons. Hydraulic variable speed means are impracticable here because of high cost, and because of the difficulty and expense of ensuring that there shall be no leakage of lubricant or hydraulic fluid from the drive mechanism to the tank. Multispeed conventional gear trains have the above disadvantages and, as well, produce high output torque which not only is not required but also can give rise to extensive damage to various parts of the train under overload and impactive stall—constant ratio conventional trains too have this latter disadvantage.

In some circumstances the material being mixed may solidify, as from freezing. It is desirable that the machine run indefinitely under the stalled condition, without damage to the motor, to any part of the drive mechanism, or to the impeller—whether the stalling load be applied gradually, or instantaneously as impact.

It will be understood that, under stalling load, the whole of the energy of the motor is transformed into heat. A major difficulty in reducing the present invention to practice has been to devise means to deal with the heat, whether from overload or stall, of long or short duration, so that no ill effect shall result.

The purposes of the invention are to provide an agitator in which the above disadvantages are reduced or overcome, and to have characteristics and advantages as follows:

A sealed unit, hereinafter referred to in this disclosure as the drive unit, consisting of an input shaft adapted to be driven, a continuously variable speed magnetic torque converter on said input shaft, and secondary reduction gears, the train terminating in a vertical rotating shaft to which the impeller or impellers are attached. The sealed unit of smooth "streamlined" form to facilitate cleaning. When the prime mover is an electric motor, the motor conveniently may attach directly to the sealed unit, the motor shaft carrying one rotor of the converter.

Overhead drive unit such that leakage, as for example of lubricant, from the unit to the tank will not take place—this to comply with sanitary specifications and, as well, for use in applications where admission of such foreign matter to the tank would be harmful. These ends to be attained without the use of friction seals.

Conventional impeller readily attachable to, and detachable from, the shaft by conventional means to provide interchangeability and to facilitate cleaning.

Complete positive overload protection for the motor, for the drive mechanism, and for the impeller.

Agitator speed, under load, continuously variable between designed limits.

A drive unit capable of operation for an indefinite period without internal maintenance.

One form of the invention in which these objects are attained is described in the following specification, taken in conjunction with the drawings in which.

Figure 1:
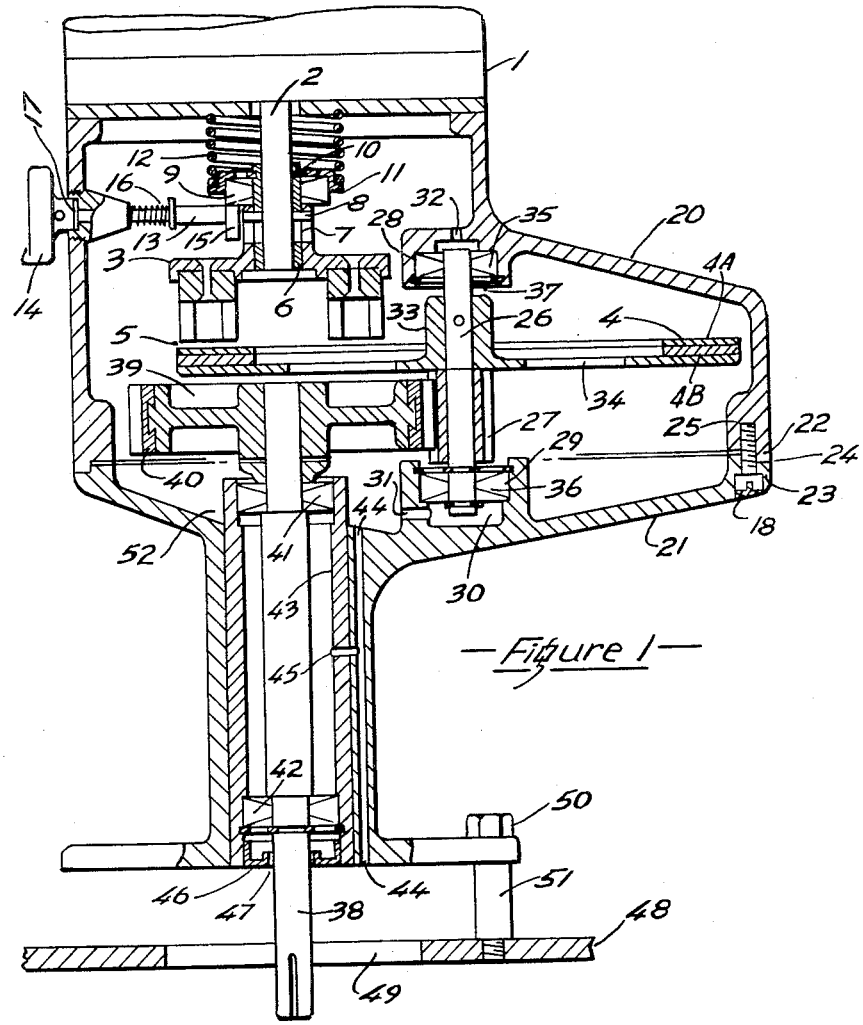
Figure 1 is an assembly in side elevation in the common plane of the main and secondary shafts, generally sectioned on that plane.

In Figure 1, 1 is the housing of the conventional electric motor, suitably of the induction type, and 2 is the motor shaft. The motor is of the vertical mounting type in which the shaft 2 is fixed axially with respect to the motor housing, with conventional end play.

3 and 4 are, respectively, magnetic rotor (driver) and bimetallic rotor (driven) or armature of the variable speed magnetic torque converter of the type described in my co-pending application for the same, said armature comprising upper and lower annular members 4A and 4B, the upper member being of non-magnetic but highly electrical conductivity material and the lower member being of magnetic permeability material.

In the position shown in Figure 1, the rotors are close together, separated by the gap 5. Speed variation is effected altering the gap at will from the minimum position shown to a maximum, suitably about half an inch, by the following means.

The magnetic rotor 3 is provided with the Oilite bushing 6, a sliding fit to the shaft 2. The bushing 6 and boss of the magnetic rotor are slotted in register as shown at 7. The drive pin 8 is secured in the shaft 2 and passes through the slots as shown, slot width is such as freely to accommodate the pin diameter, and slot length is suitably about half an inch, plus diameter of pin. This permits axial movement of the magnetic rotor 3—with Oilite bushing 6—in the required amount while, at the same time, the magnetic rotor 3 rotates with the shaft 2, torque being transmitted by the drive pin 8.

The sealed prelubricated bearing 9 is secured to the upper end of the bushing 6 in the position shown by the snap ring 10, said bushing forming a peripheral collar. The boss of the magnetic rotor bears against the inner race of said bearing. The flanged cap 11 fits over the outer race as shown. One end of compression spring 12 bears against the lower flange of cap 11 the other end bearing against the housing as shown. Thus the spring tends to force the magnetic rotor 3 downward, or towards the close gap position.

The member 13 is suitably secured in the housing and carries the control knob 14 pinned thereto, as shown. The eccentric cam 15 on the inner end of 13 bears against the outer race of the bearing 9. Spring 16, under compression, serves to force the knob 14 against the washer 17 to provide sufficient friction that the control knob will remain in any position as set. Throw of the cam is such that one half revolution of the control knob 14 (or such fraction of a half revolution as may be expedient) from the position shown will increase the gap 5 to the maximum. Thus any desired gap between maximum and minimum is obtainable by suitable rotation of the control knob 14. A raised index mark 19 on the control knob serves to indicate the position to which it is set.

The main housing is of metal of high thermal conductivity, such as aluminum or magnesium alloy. It consists of an upper piece 20 and a lower piece 21. These are flanged as shown at 22 and 23, the housing parts being circular at the flange. The flanges are machined to seal at the bearing faces as indicated at 24. A number of countersunk bolts, one only of which is shown, at 25, fasten the two parts of the housing together. Sealing material is used on the bolt heads as shown at 18, to make good the smooth surface.

The shaft carrying the driven element 4 of the magnetic torque converter is shown at 26, the said shaft having a pinion 27 conveniently integral with 26. Sealed bearings 35 and 36 at each end of the shaft are suitably seated in the main housing as shown at 28 and 29. In the lower seat 29 is the depression 30, the purpose of which is to receive any slight leakage from the lower bearing. Vents 31 and 32 are provided as shown at lower and upper seats.

In operation heat is generated in the converter originating in the bimetallic member 4. Transmission of this heat towards the central boss 33 of this member is reduced by the provision of a number of holes, as at 34, in the web. The lower bearing 36 is fixed with respect both to the shaft 26 and seat 29 by suitable conventional means shown.

Construction is such that, when assembled, there is clearance 37 between the top of the boss 33 and the bottom of the upper bearing 35, the clearance is sufficient to allow the shaft 26 to expand, as it heats, without loading the bearing 35, and prevent conduction of heat from 33 to 35.

Speed reduction in the ratio $(100-s)$ percent $\times D_3/D_4$ is provided by the variable speed torque converter—where $D_3$ and $D_4$ are respectively the effective diameters of the driving and driven members, and $s$ is the percentage slip. Further speed reduction is required to provide suitable impeller shaft speed and torque.

The impeller shaft 38 accordingly has the gear 39 suitably keyed or pinned to it in the position shown. The teeth 40 of this gear are of nylon or similar material. The speed of the output shaft is slow, in a typical application it might turn at 30 R. P. M. At these speeds the nylon teeth will operate without lubrication under the favorable load condition obtained by magnetic power transmission means, when means are provided to prevent overheating. The cushioning effect of magnetic drive, and the overload protection provided as will be described, protect the nylon teeth from shock. As a result the nylon gear, unlubricated, has long life in this application, the teeth may have longer life than the bearings.

The position of the shaft 38 with gear 39 is such that the latter meshes with the integral pinion 27 providing final drive at the desired speed. It will be understood that the reduction ratio of this pair is a matter of design, taking into consideration motor speed and power, reduction range of the magnetic torque converter, and the requirements of the specific application. Shafts 38 and 2 are conveniently coaxial as shown in Figure 1, 38 being secured in the bushing 43 suitably fixed in the lower housing as shown.

The impeller shaft 38 is journalled by the bearings 41 and 42. The bushing is a sliding fit to the outer race of upper bearing 41 which bearing is suitably fixed on shaft 38 as shown. The lower bearing 42 is in fixed position both with respect to the shaft 38 and to the bushing 43 as shown. Thus the impeller shaft, being axially restrained only at its lower end, is free to expand as it heats.

The air vent 44 is provided in the lower housing which vent also opens to the bushing 43 as shown at 45. The vent serves to equalize the internal pressure to that of the outside air, this is necessary because of the heat generated in the magnetic converter.

The lipped seal 46 is a push fit to the lower end of the bushing 43 as shown. The inside diameter of 46 is slightly larger than the diameter of the shaft 38 at this position to provide clearance as shown at 47, which clearance need be a few thousandths only. The lipped cup will receive any slight leakage from the lower bearing 42, or and from the upper bearing 41. The said means serves also to seal the shaft outlet, which seal is frictionless as 46 is not in contact with the output shaft 38.

48 is the top of the conventional agitator tank, having impeller shaft opening 49. The sealed drive unit is conveniently attached to the tank by means of three attachment bolts 50, and supported clear of the tank by means of the bushings 51—only one such bolt is shown in Figure 1.

Conventional means are provided for the attachment of impellers to the lower end of the shaft 38.

The operation of the invention to attain the desired objects will be apparent from the above specification and the following further explanation.

The drive unit is completely sealed including the drive shaft outlet. The nylon gear requires no lubrication, all bearings are of sealed prelubricated type. Possible leakage from the drive unit is then only the drop or so of lubricant from the sealed bearings. The lipped seal 46 effectively retains such leakage, particularly that from bearing 42, within the unit. Similarly leakage from bearing 36 will be caught at 30.

Other small internal leakage from the bearings, or from the motor, will either be cast outwards by centrifugal force to adhere to the inside of the main housing, or will collect in the hollows as at 52.

It is a property of a magnetic torque converter that torque in excess of a determinate value, according to the capacity of the particular converter, cannot arise in the driven shaft 26. Let this limiting value be $T_0$ max, see Figure 2. With 3:1 torque multiplication, suitable for the embodiment described, torque in excess of $T_0$ max/3 cannot arise in the shaft 2. If the driving motor, suitably of the induction type, be such that it has safe continuous load capacity in excess of this, then it cannot be overloaded through the converter. Further, starting torque is initially zero—torque builds up slowly as speed increases. So there can be no starting problem. Similarly, torque cannot arise in output shaft 38 greater than $T_0$ max$\times R$, where R is the ratio of gear 39 to pinion 27. Mechanical strength throughout may then be designed to be safe for this maximum load. Neglecting momentum effects, even an impactive stalling load cannot stress any part of the mechanism beyond these limits. Thus complete overload protection is attained.

Figure 2:
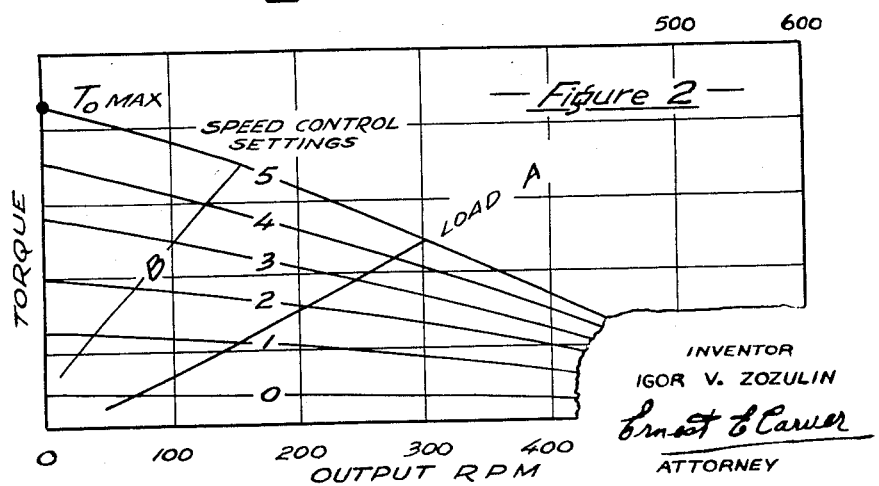
Figure 2 is characteristic performance curves.

Speed control functions as follows, referring to Figure 2. Curves 5 through 0 show the relation between speed and torque in shaft 26 for a variable speed torque converter suitable for agitator drive. Note that speed of impeller shaft 38 is $1/R$ times the speeds shown in the figure. Curve 5 is for maximum speed setting minimum air gap 5 of Figure 1. Successively increased axial gap settings of the control knob 14 to maximum for curve 0, give the several characteristic curves shown.

The curve marked "load A" shows torque speed relation for a typical agitator impeller working in milk, here too R. P. M. shown is that of shaft 26. At setting 5, speed is 300 R. P. M. at the intersection of the load curve with curve 5; at setting 4, 275 R. P. M.; at 3, 240;

and so on until at 0 speed drops to 70. Similarly, with different conditions such as shown by the load "load B" curve, R. P. M. at any speed control setting may be read off. For all the curves shown, drive is by induction motor with sensibly constant speed of some 1725 R. P. M. of shaft 2.

The means described to deal with heat, that is the venting and other precautions, are adequate to protect the bearings. The life of the torque converter is then that of the bearings, that is to say indefinite. The nylon gear on the low speed output shaft requires neither lubrication nor maintenance. Protected from shock and heat as has been explained, it too is of indefinite life.

The invention is capable of a number of modifications and alternative constructions. There is shown in the drawings and described in detail hereinabove a preferred embodiment. It is however to be understood that the subject invention is not limited thereto, but is intended to cover such modifications and alternative constructions as fall within the spirit and scope of the invention as expressed in the description, illustrated by the drawings, and as set forth in the appended claims.

What I claim as my invention is:

1. An agitator comprising in combination with a housing having a vertical final drive shaft, a magnetic drive mechanism including a magnetic drive rotor and a driven rotor, said drive rotor being connected to the shaft of a motor carried by the housing and being mounted for vertical sliding movement thereon, said driven rotor being mounted upon a vertical shaft within the housing, said driven rotor having an armature formed of an annular member of magnetic material and an overlying annular member of non-magnetic material of high electrical conductivity, spring means for urging the drive rotor downwardly towards the armature and a manually operable cam for raising the drive rotor away from the armature.

2. An agitator as claimed in claim 1, wherein the drive rotor is fitted with a self-lubricating bushing and said bushing is slidable upon the motor shaft, said motor shaft having a transverse drive pin non-rotatively engaging the bushing, said bushing having a peripheral collar and said cam being set to engage the peripheral collar to raise said bushing and the drive rotor to widen the air gap between said rotors.

3. An agitator as claimed in claim 1, wherein the drive rotor is fitted with a self-lubricating bushing and said bushing is slidable upon the motor shaft, said motor shaft having a transverse drive pin non-rotatively engaging the bushing, said bushing having a peripheral collar and said cam being set to engage the peripheral collar to raise said bushing and the drive rotor to widen the air gap between said rotors, said driven rotor shaft being gear connected with the final drive shaft and the final drive shaft having plastic teeth.

4. An agitator as claimed in claim 1, wherein the drive rotor is fitted with a self-lubricating bushing and said bushing is slidable upon the motor shaft, said motor shaft having a transverse drive pin non-rotatively engaging the bushing, said bushing having a peripheral collar and said cam being set to engage the peripheral collar to raise said bushing and the drive rotor to widen the air gap between said rotors, said driven rotor shaft having its ends carried in depression enclosed bearings, said depressions having vents to equalize pressure between the ends and the intermediate portions of said driven rotor shaft.

5. An agitator comprising in combination with a housing having a vertical final drive shaft, a magnetic drive mechanism including a magnetic drive rotor and a driven rotor, said drive rotor being connected to the shaft of a motor carried by the housing and being mounted for vertical sliding movement thereon, said driven rotor being mounted upon a vertical shaft within the housing, said driven rotor having an armature formed of an annular member of magnetic material and an overlying annular member of non-magnetic material of highly electrical conductivity, said driven rotor being operatively connected to the final drive shaft within the housing, spring means of urging the drive rotor downwardly towards the armature and a manually operable cam for raising the drive rotor away from the armature.

References Cited in the file of this patent

UNITED STATES PATENTS

| 1,817,660 | Winther et al. | Aug. 4, 1931 |
| 2,104,608 | Cox et al. | Jan. 4, 1938 |

FOREIGN PATENTS

| 515,832 | Belgium | May 27, 1953 |